No. 678,772. Patented July 16, 1901.
J. H. BRANDT.
BALL BEARING.
(Application filed Nov. 5, 1900.)
(No Model.)

WITNESSES:
L. E. Tibbetts.
V. D. Stockbridge

INVENTOR:
JOSEPH H. BRANDT,
By Renford M. Smith
Atty.

UNITED STATES PATENT OFFICE.

JOSEPH H. BRANDT, OF NORRISTOWN, PENNSYLVANIA.

BALL-BEARING.

SPECIFICATION forming part of Letters Patent No. 678,772, dated July 16, 1901.

Application filed November 5, 1900. Serial No. 35,505. (No model.)

*To all whom it may concern:*

Be it known that I, JOSEPH H. BRANDT, a citizen of the United States, residing at Norristown, in the county of Montgomery and State of Pennsylvania, have invented a certain new and useful Ball-Bearing, of which the following is a specification, reference being had therein to the accompanying drawings.

My invention relates to ball-bearings of the class wherein the balls are given a true rolling motion instead of a twisting or boring motion; and my improvements are particularly adapted for large journals for shafts and axles of motor-cycles, cars, &c.

My invention comprises an outer bearing member provided with two internal concentric cone-surfaces which oppositely converge toward the center of the bearing, two inner bearing members adjustably mounted in fixed relation with the axle respectively opposed to the two cone-surfaces of the outer bearing member and each provided with a plurality of V-shaped ball-races of different diameters, a series of balls in each of said races bearing against the conical face of the outer bearing member opposed thereto, a ring-retainer for each series of the balls, and means to effect the relative adjustment of said race-provided members, as hereinafter described and claimed.

Figure 1:
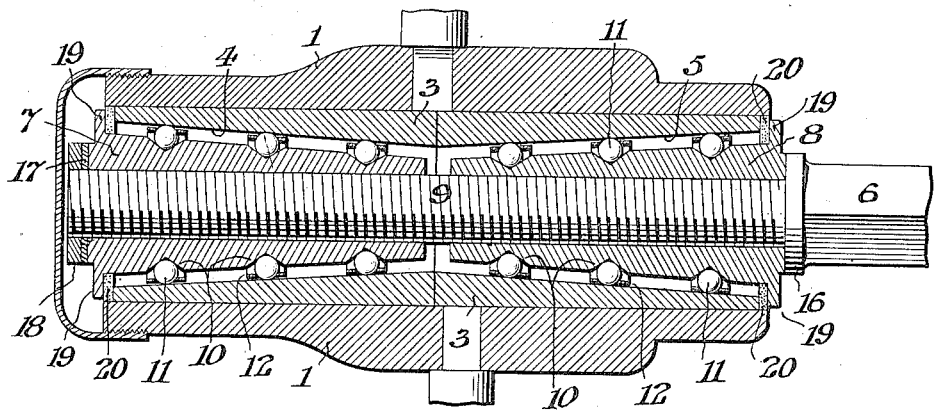
Figure 2:
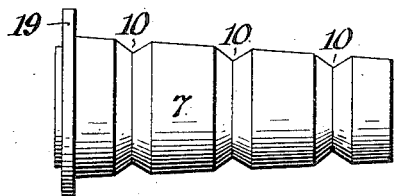
Figure 3:
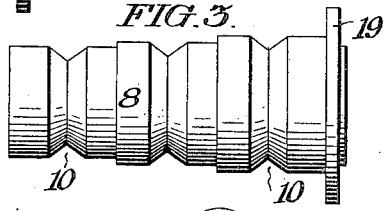
Figure 4:
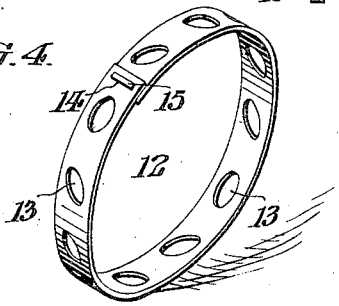

In the accompanying drawings, Figure 1 is a longitudinal sectional view of a vehicle wheel-hub, showing a convenient embodiment of my invention applied thereto. Fig. 2 is a side elevation of one of the inner bearing members shown in Fig. 1. Fig. 3 shows a side elevation of a modified form of inner bearing member. Fig. 4 is a perspective view of a convenient form of ball-retainer ring.

In said drawings, 1 is the wheel-hub, which comprises one or more sleeves, forming the outer bearing member 3, provided with oppositely-convergent inner cone-surfaces 4 and 5. The axle 6 is provided with what I term the "inner" bearing members or cones 7 and 8, mounted concentrically within the respective conical ends of the outer bearing member 3 in rotatable relation therewith.

The extremity of the axle 6, extending within the bearing, is provided with a screw-thread 9, upon which the inner bearing members 7 and 8 are normally fixed, as shown. Said inner bearing members 7 and 8 are each provided with a plurality of ball-races 10, in each of which races is mounted a series of balls 11. The several races being of different diameters are so related that the respective series of balls bear equally, and thus distribute the load from end to end of the bearing. In order that said balls 11 may be equally spaced in their respective races 10, I provide each series of the balls with a retaining-ring 12, comprising any desired number of apertures 13 for the individual balls of the series, and in order to facilitate the assembling of the parts in the position shown in Fig. 1 I prefer to form said retaining-rings 12 of strips of sheet metal bent to shape and provided with interengaging devices at their meeting ends. In the form shown in Fig. 4 one end of the ring 13 is provided with a slot 14, in which is engaged the lug 15, extending from the other end of the ring.

The parts above described are assembled as follows: Each of the series of balls being mounted in its race and inclosed by its retaining-ring 12, the bearing 7 is first placed in the hub and the axle containing the bearing member 8 is screwed into it, where it remains fixed during the operation of the bearing. The bearing members 7 and 8 are adjusted upon the axle until each of the series of balls 11 is in rolling contact with both the inner and outer members of the bearing, whereupon the washer 17 and jam-nut 18 are so set upon the extremity of the screw-thread 9 as to fix the parts in the position to which they have been adjusted.

In order to prevent access of dust within the bearing, I find it convenient to provide the inner bearing members with circumferential flanges 19, which support washers 20, of felt or similar elastic material, and which washers fill the interspace between the inner and outer bearing members at the ends thereof. It is to be understood, however, that the interposition of the washers 20 does not prevent the longitudinal adjustment of the bearing members upon the screw-thread 9 to compensate for wear of the parts.

Although I have shown the opposite sleeves of the outer bearing members as separately formed, it is obvious that they may be comprised in one piece, and if counterpart said opposite sleeves are conveniently interchangeable. However, it is immaterial whether the opposite sleeves are counterpart or not, provided that the parts are so related as to operate in the manner above described.

Although I have found it convenient to make the inner bearing members 7 and 8 conical and of the same angle as the cone-surfaces to which they are opposed, it is obvious that the particular contour of the metal connecting the adjoining ball-races is immaterial. For instance, said bearings may be of the cylindrical form shown in Fig. 3, the respective races being of course of proper diameter to present the balls against the opposed conical surface, and while each cone is shown as made in one piece it is obvious that they might be comprised of several pieces and joined together with a lug or key-pin.

I claim—

1. In a ball-bearing, the combination with a vehicle wheel-hub, and axle, of twin sleeves fitted in the hub and having bores of uniform taper from end to end and contracting in diameter toward their inner meeting ends, twin cones adjustably mounted upon the axle and having reversely-tapered outer surfaces concentric with the walls of the bores of the sleeves, and each provided with a plurality of V-shaped ball-races of different diameters, a series of balls in each race bearing against the sleeves, a ring-retainer for each series of balls, and means for fixing the adjustment of the cones, substantially as set forth.

2. In a ball-bearing, the combination with an axle, of an outer bearing member in rotatable relation with said axle, and comprising two concentric cone-surfaces, which oppositely converge toward the center of the bearing, two inner bearing members adjustably mounted in fixed relation with the axle, concentrically within and respectively opposed to said two cone-surfaces of the outer bearing, and each provided with a plurality of V-shaped ball-races of different diameters, a series of balls in each race, bearing against the conical face of the outer bearing member, opposed thereto, a ring-retainer for each series of balls, and means to effect the relative adjustment of said race-provided members, substantially as set forth.

In testimony whereof I affix my signature in presence of two witnesses.

JOSEPH H. BRANDT.

Witnesses:
 MUSCOE M. GIBSON,
 HELEN C. MEEK.